(12) United States Patent
Kim et al.

(10) Patent No.: US 10,700,785 B2
(45) Date of Patent: Jun. 30, 2020

(54) OPTICAL TRANSCEIVER

(71) Applicants: SK hynix Inc., Icheon (KR); Korea University Research and Business Foundation, Seoul (KR)

(72) Inventors: Chul Woo Kim, Seoul (KR); Sang Geun Bae, Seoul (KR); Hyun Su Park, Seoul (KR); Choong Hwan Lee, Seoul (KR)

(73) Assignees: SK hynix Inc., Icheon (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/565,222

(22) Filed: Sep. 9, 2019

(65) Prior Publication Data

US 2020/0007239 A1 Jan. 2, 2020

Related U.S. Application Data

(62) Division of application No. 15/797,772, filed on Oct. 30, 2017, now Pat. No. 10,447,402.

(30) Foreign Application Priority Data

Apr. 10, 2017 (KR) .................. 10-2017-0046190

(51) Int. Cl.
*H04B 10/40* (2013.01)
*H04B 10/61* (2013.01)
*H04B 10/50* (2013.01)
*H04B 10/58* (2013.01)
*H04B 10/69* (2013.01)

(52) U.S. Cl.
CPC .......... *H04B 10/40* (2013.01); *H04B 10/503* (2013.01); *H04B 10/58* (2013.01); *H04B 10/616* (2013.01); *H04B 10/69* (2013.01)

(58) Field of Classification Search
CPC ..... H04B 10/40; H04B 10/616; H04B 10/503
See application file for complete search history.

(56) References Cited

U.S. PATENT DOCUMENTS

| 2006/0221427 | A1* | 10/2006 | Wu | .................. G02F 1/025 359/241 |
| 2007/0098026 | A1* | 5/2007 | Uesaka | ................ H01S 5/042 372/29.01 |
| 2013/0121356 | A1* | 5/2013 | Sugawara | .......... H05B 33/0812 372/38.02 |

(Continued)

FOREIGN PATENT DOCUMENTS

| KR | 1020140117972 | 10/2014 |
| KR | 1020160030249 | 3/2016 |

*Primary Examiner* — Dzung D Tran

(57) ABSTRACT

An optical transceiver includes an optical transmitter and an optical receiver. The optical transmitter includes a laser diode configured to convert a current signal into an optical signal; a main driver comprising first and second output terminals that have a differential structure, the main driver configured to drive the first and second output terminals in response to differential input signals and to provide the current signal to the laser diode through the first output terminal; and an impedance balancer configured to match impedances of the first and second output terminals by adjusting the impedance of the second output terminal according to signal states of the first and second output terminals.

3 Claims, 4 Drawing Sheets

(56) References Cited

U.S. PATENT DOCUMENTS

2014/0376582 A1* 12/2014 Kao .................. H01S 5/042
                                                    372/38.01
2017/0201327 A1*  7/2017 Jiang ................ H04B 10/616
2018/0014095 A1*  1/2018 Tanaka ............... H04B 10/03

* cited by examiner

OPTICAL TRANSCEIVER

CROSS-REFERENCE TO RELATED APPLICATIONS

The present application is a divisional of U.S. application Ser. No. 15/797,772, filed Oct. 30, 2017, which claims priority to Korean Patent Application No. 10-2017-0046190, filed on Apr. 10, 2017, which is incorporated herein by reference in its entirety.

BACKGROUND

1. Field

Various embodiments relate to optical communication technology, and more particularly, an optical transceiver based on a high-performance optical interface.

2. Description of the Related Art

In general, an optical transceiver converts an electrical signal into an optical signal or converts an optical signal into an electrical signal between an optical cable coupled to an optical communication network and a device for transmitting or receiving data. Since such an optical transceiver has a long transmission distance and a high transmission speed, the optical transceiver is used for high-speed large-capacity data communications.

The optical transceiver includes an optical transmitter and an optical receiver.

The optical transmitter is coupled to a laser diode for converting an electrical signal into an optical signal, and includes a laser diode driving circuit for driving the laser diode. The laser diode driving circuit of the optical transmitter has a differential structure, but an output terminal of the laser diode driving circuit, which is connected to the laser diode, has a single-ended structure.

Therefore, the optical transmitter may be vulnerable to a supply voltage fluctuation, a substrate noise, or the like. In order to address such a drawback, a conventional optical transmitter includes a resistor having a fixed resistance value that matches with an impedance of the laser diode.

However, the laser diode has a non-linear characteristic when subjected to a temperature variation. Thus, when an ambient temperature of the optical transmitter varies, the impedance of the laser diode may be non-linearly changed. In this case, an impedance matching operation may not be accurately performed. This may degrade a noise characteristic and a gain, such that optical signal transmission is poorly influenced.

The optical receiver is coupled to a photoelectric diode for converting an optical signal into an electrical signal, and includes a trans-impedance amplifier for amplifying the electrical signal and a limiting amplifier for limiting an amplitude of an output signal. The trans-impedance amplifier of the optical receiver has a single-ended structure in which an input terminal thereof is connected to the photoelectric diode.

Thus, the optical receiver may also be vulnerable to a supply voltage fluctuation, a substrate noise, or the like. In order to address such a drawback, a conventional optical receiver includes an RC passive filter installed between the trans-impedance amplifier and the limiting amplifier. The RC passive filter serves to filter noise and hold an opposite input voltage. However, since the RC passive filter of the conventional optical receiver should have a large time constant for a stable operation, a chip area occupied by the optical receiver is inevitably increased and a response time is increased.

SUMMARY

Various embodiments are directed to an optical transceiver capable of efficiently removing a noise and securing a fast response speed.

In an embodiment, an optical transmitter may include: a laser diode configured to convert a current signal into an optical signal; a main driver comprising first and second output terminals that have a differential structure, the main driver configured to drive the first and second output terminals in response to differential input signals and to provide the current signal to the laser diode through the first output terminal; and an impedance balancer configured to match impedances of the first and second output terminals by adjusting the impedance of the second output terminal according to signal states of the first and second output terminals.

In an embodiment, an optical receiver may include: a photoelectric diode configured to convert an optical signal into a current signal; a first trans-impedance amplifier configured to convert the current signal into a first voltage signal by amplifying a high-frequency component of the current signal; a replica circuit configured to output a current signal tracking a DC voltage of the current signal; a second trans-impedance amplifier configured to output the current of the replica circuit into a second voltage signal by amplifying the current; and a multi-stage limiting amplifier configured to differentially amplify the first and second voltage signals, and to output a pair of output signals having a predetermined amplitude.

In an embodiment, an optical transceiver may include: an optical transmitter configured to generate a first current signal for driving a laser diode in response to a data signal, and to provide the first current signal to the laser diode, such that the laser diode converts the first current signal into an optical signal and transmits the optical signal; and an optical receiver configured to receive a second current signal from a photoelectric diode that converts the optical signal into the second current signal, and to generate a pair of data signals from the second current signal, wherein the optical transmitter performs an impedance matching operation according to an impedance of a first output terminal coupled to the laser diode.

DETAILED DESCRIPTION

Figure 1:
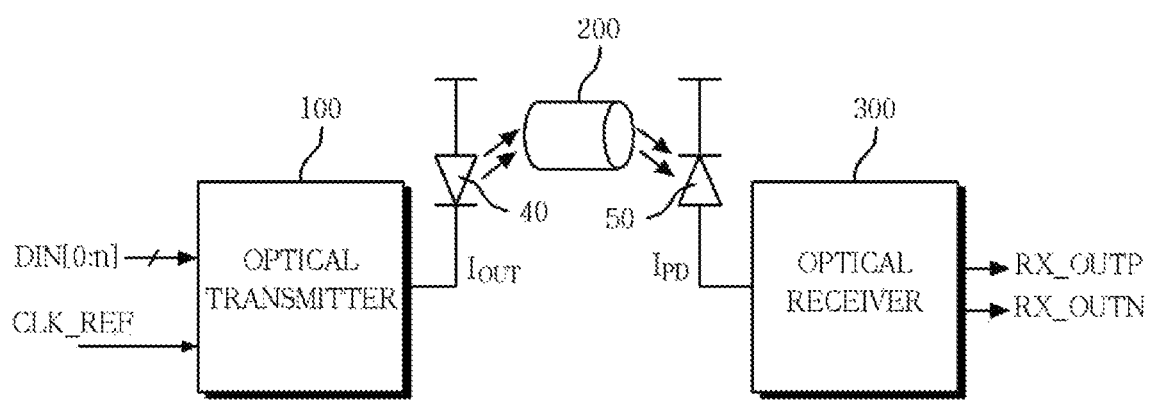
FIG. 1 illustrates an optical transceiver according to an embodiment.

Various embodiments will be described below in more detail with reference to the accompanying drawings such that this disclosure will be thorough and complete, and will fully convey the scope of the embodiments to those skilled in the art. Throughout the disclosure, like reference numerals refer to like parts throughout the various figures and embodiments of the present invention.

Moreover, detailed descriptions related to well-known functions or configurations will be omitted in order to not obscure subject matter of the present invention.

The terms such as 'first' and 'second' may be used to describe various components, but the components are not limited by the terms, and the terms are used only to distinguish one component from another component.

FIG. 1 illustrates an optical transceiver according to an embodiment. The optical transceiver includes an optical transmitter 100 and an optical receiver 300.

Referring to FIG. 1, the optical transmitter 100 receives data signals DIN[0:n], and provides an electrical signal corresponding to the data signals DIN[0:n] to a laser diode 40, n being a positive integer. The optical transmitter 100 performs impedance matching according to an impedance of an output terminal coupled to the laser diode 40. A detailed description thereof will be given with reference to FIG. 3.

Figure 2:
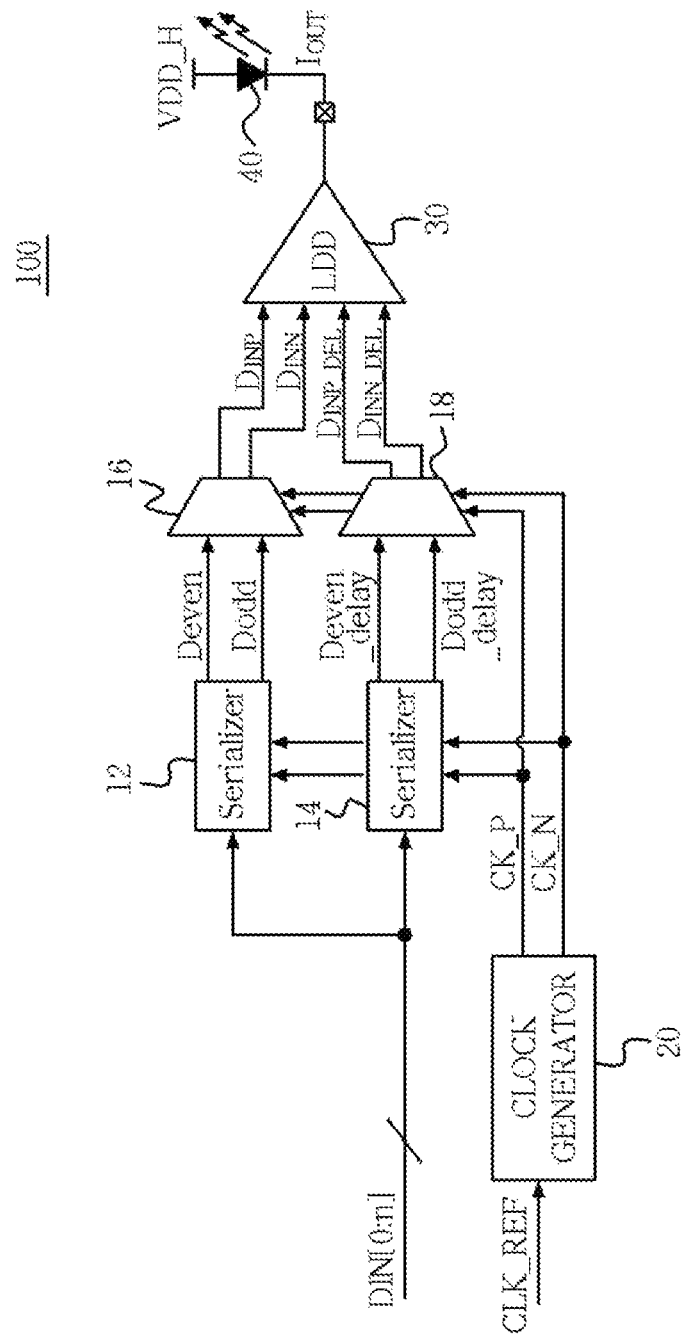
FIG. 2 illustrates an optical transmitter according to an embodiment.

Referring to FIG. 2, the optical transmitter 100 may include serializers 12 and 14 for serializing the data signals DIN[0:n] input in parallel and a laser diode driver (LDD) 30 for driving the laser diode 40. A detailed description of the optical transmitter 100 will be given with reference to FIG. 2.

The laser diode 40 converts the electrical signal corresponding to the data signals DIN[0:n] into an optical signal, and the optical signal is transmitted to a photoelectric diode 50 through an optical fiber 200. The laser diode 40 may include a Vertical-Cavity Surface-Emitting Laser (VCSEL).

The photoelectric diode 50 converts the optical signal, which has been transmitted through the optical fiber 200, into an electrical signal and provides the electrical signal to the optical receiver 300. The optical receiver 300 converts the electrical signal into data signals RX_OUTP and RX_OUTN.

Figure 4:
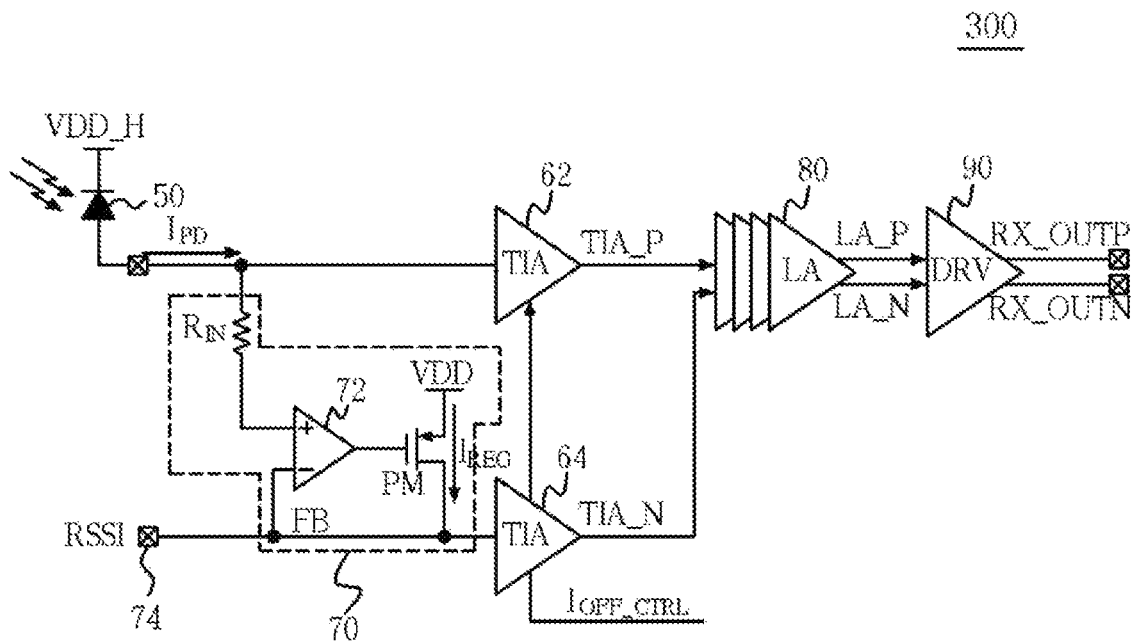
FIG. 4 illustrates an optical receiver according to an embodiment.

Referring to FIG. 4, the optical receiver 300 may include trans-impedance amplifiers 62 and 64 and a multi-stage limiting amplifier 80. The trans-impedance amplifiers 62 and 64 amplify the electrical signal received from the photoelectric diode 50. The multi-stage limiting amplifier 80 amplifies the electrical signal, which has been amplified by the trans-impedance amplifiers 62 and 64, and outputs the electrical signal, which has been amplified by the multi-stage limiting amplifier 80, at a predetermined amplitude. A detailed description of the optical receiver 300 will be given with reference to FIG. 4.

FIG. 2 illustrates the optical transmitter 100 of FIG. 1 according to an embodiment.

Referring to FIG. 2, the optical transmitter 100 includes the serializers 12 and 14, multiplexers 16 and 18, a clock generator 20, and the laser diode driver 30.

The serializer 12 converts the data signals DIN[0:n] input in parallel into serial data signals Deven and Dodd, and the serializer 14 converts the data signals DIN[0:n] into delayed data signals Deven_delay and Dodd_delay. For example, when the data signals DIN[0:n] has 16 bits, the serial data signal Deven is obtained by serializing even-numbered data bits of the data signals DIN[0:n], the serial data signal Dodd is obtained by serializing odd-numbered data bits of the data signals DIN[0:n], and the delayed serial data signals Deven_delay and Dodd_delay are obtained by delaying the serial data signals Deven and Dodd by a predetermined time, respectively.

For example, the serializers 12 and 14 convert the data signals DIN[0:n] input in parallel into the serial data signals Deven and Dodd and the delayed serial data signals Deven_delay and Dodd_delay, respectively, in synchronization with first and second clock signals CK_P and CK_N provided from the clock generator 20. The first and second clock signals CK_P and CK_N are provided in common to the serializers 12 and 14.

The multiplexer 16 selects the serial data signals Deven and Dodd and provides the selected signals, as differential input signals $D_{INP}$ and $D_{INN}$, to the laser diode driver 30. The multiplexer 18 selects the delayed serial data signals Deven_delay and Dodd_delay and provides the selected signals, as delayed differential input signals $D_{INP\_DEL}$ and $D_{INN\_DEL}$, to the laser diode driver 30. For example, the multiplexers 16 and 18 may output the differential input signals $D_{INP}$ and $D_{INN}$ and the delayed differential input signals $D_{INP\_DEL}$ and $D_{INN\_DEL}$, in synchronization with the first and second clock signals CK_P and CK_N provided from the clock generator 20.

The clock generator 20 receives a reference clock signal CLK_REF, and generates the first and second clock signals CK_P and CK_N using the reference clock signal CLK_REF. For example, the clock generator 20 may include a phase locked loop (PLL), a clock chain, a duty cycle compensator, and the like.

The laser diode driver 30 drives the laser diode 40 in response to the differential input signals $D_{INP}$ and $D_{INN}$, and additionally drives the laser diode 40 to a current mode in response to the delayed differential input signals $D_{INP\_DEL}$ and $D_{INN\_DEL}$. The laser diode driver 30 according to the present embodiment includes two output terminals having a differential structure, and one output terminal of the differential structure has an impedance that is automatically adjusted and matched with an impedance of the other output terminal of the differential structure according to an impedance of the laser diode 40.

Figure 3:
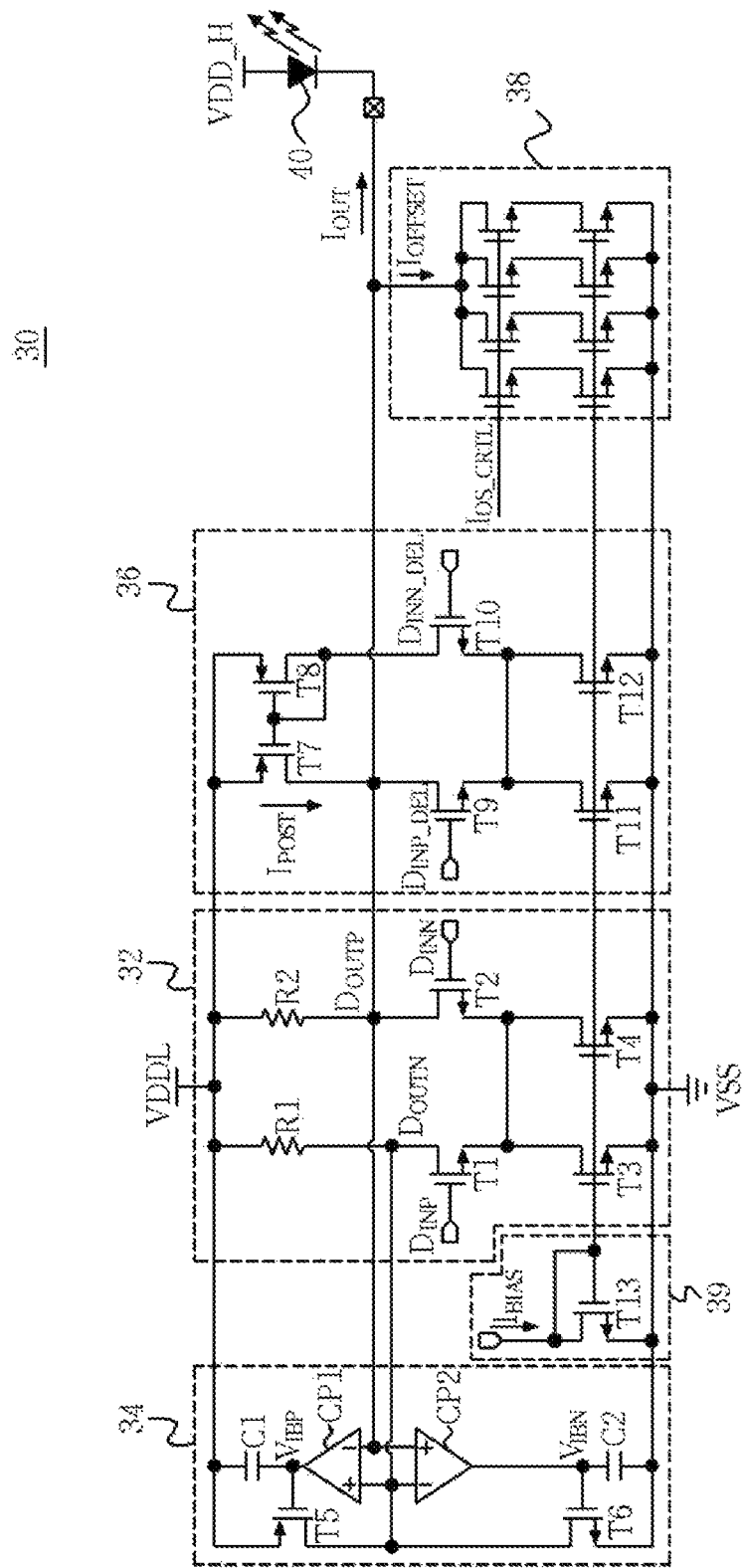
FIG. 3 illustrates a laser diode driver of FIG. 2 according to an embodiment.

FIG. 3 illustrates the laser diode driver 30 of FIG. 2 according to an embodiment. Referring to FIG. 3, the laser diode driver 30 includes a main driver 32, an impedance balancer 34, a pre-emphasis unit 36, an offset current control unit 38, and a bias providing unit 39.

The main driver 32 has first and second output terminals $D_{OUTP}$ and $D_{OUTN}$ having a differential structure, drives the first and second output terminals $D_{OUTP}$ and $D_{OUTN}$ in response to the differential input signals $D_{INP}$ and $D_{INN}$, and provides an electrical signal, e.g., a current signal $I_{OUT}$, to the laser diode 40 through the first output terminal $D_{OUTP}$. The first output terminal $D_{OUTP}$ is coupled to the laser diode 40, the pre-emphasis unit 36, and the impedance balancer 34. The second output terminal $D_{OUTN}$ is coupled to the impedance balancer 34. An impedance of the second output terminal $D_{OUTN}$ is adjusted by the impedance balancer 34.

The main driver 32 includes first and second transistors T1 and T2, first and second resistors R1 and R2, and third and fourth transistors T3 and T4. The first and second transistors T1 and T2 have drains coupled to the second and first output terminals $D_{OUTN}$ and $D_{OUTP}$, respectively; gates coupled to first and second input terminals, which receive the differential input signals $D_{INP}$ and $D_{INN}$, respectively; and sources coupled to each other. The first and second resistors R1 and R2 have first ends coupled to the second and first output terminals $D_{OUTN}$ and $D_{OUTP}$, respectively, and second ends coupled, in common, to a power supply terminal VDDL. The third and fourth transistors T3 and T4 have drains coupled to a common node of the sources of the first and second transistors T1 and T2, gates coupled to a bias terminal receiving a bias current $I_{BIAS}$, and sources coupled, in common, to a ground terminal VSS.

The impedance balancer 34 performs a comparison of signals of the first and second output terminals $D_{OUTP}$ and $D_{OUTN}$, and matches impedances of the first and second output terminals $D_{OUTP}$ and $D_{OUTN}$ by adjusting the impedance of the second output terminal $D_{OUTN}$ according to a result of the comparison. The impedance of the first output terminal $D_{OUTP}$ coupled to the laser diode 40 may be non-linearly changed according to a temperature variation. In order to match the impedances of the first and second output terminals $D_{OUTP}$ and $D_{OUTN}$, the impedance balancer 34 adjusts the impedance of the second output terminal $D_{OUTN}$ by pull-up or pull-down driving the second output terminal $D_{OUTN}$ according to the comparison result between the signals of the first and second output terminals $D_{OUTP}$ and $D_{OUTN}$.

The impedance balancer 34 includes first and second comparators CP1 and CP2, first and second capacitors C1 and C2, and fifth and sixth transistors T5 and T6. The first comparator CP1 has a negative input terminal (−) coupled to the first output terminal $D_{OUTP}$ and a positive input terminal (+) coupled to the second output terminal $D_{OUTN}$. The first comparator CP1 compares the signals of the first and second output terminals $D_{OUTP}$ and $D_{OUTN}$, and provides, through an output terminal, a first comparison signal $V_{IBP}$ to the first capacitor C1 and a gate of the fifth transistor T5. The second comparator CP2 has a negative input terminal (−) coupled to the second output terminal $D_{OUTN}$ and a positive input terminal (+) coupled to the first output terminal $D_{OUTP}$. The second comparator CP2 compares the signals of the first and second output terminals $D_{OUTP}$ and $D_{OUTN}$, and provides, through an output terminal, a second comparison signal $V_{IBN}$ to the second capacitor C2 and a gate of the sixth transistor T6.

The first capacitor C1 has one end coupled to the power supply terminal VDDL and the other end coupled to the output terminal of the first comparator CP1, and the second capacitor C2 has one end coupled to the ground terminal VSS and the other end coupled to the output terminal of the second comparator CP2. The fifth transistor T5 has a source coupled to the power supply terminal VDDL, the gate coupled to the output terminal of the first comparator CP1, and a drain coupled to the second output terminal $D_{OUTN}$ of the main driver 32. The sixth transistor T6 has a source coupled to the ground terminal VSS, the gate coupled to the output terminal of the second comparator CP2, and a drain coupled to the second output terminal $D_{OUTN}$ of the main driver 32.

Since the impedance balancer 34 having the above-described configuration pull-up or pull-down drives the second output terminal $D_{OUTN}$ according to the comparison result between the signals of the first and second output terminals $D_{OUTP}$ and $D_{OUTN}$, the impedance balancer 34 can accurately match the impedance of the second output terminal $D_{OUTN}$ with the impedance of the first output terminal $D_{OUTP}$. In this way, the impedance balancer 34 can accurately match the impedances of the first and second output terminals $D_{OUTP}$ and $D_{OUTN}$, even when the impedance of the first output terminal $D_{OUTP}$ coupled to the laser diode 40 is non-linearly changed by a temperature variation.

The pre-emphasis unit 36 additionally drives the first output terminal $D_{OUTP}$ with a mirroring current $I_{POST}$, in response to the delayed differential input signals $D_{INP\_DEL}$ and $D_{INN\_DEL}$.

The laser diode driver 30 is connected to the laser diode 40 through a bonding wire. Therefore, when signal transmission of the optical transmitter 100 is performed at a high speed, a bandwidth of the optical transmitter 100 may be reduced by the bonding wire. In the present embodiment, since the pre-emphasis unit 36 can additionally drive the first output terminal $D_{OUTP}$ with the mirroring current $I_{POST}$ in response to the delayed differential input signals $D_{INP\_DEL}$ and $D_{INN\_DEL}$, it is possible to prevent the reduction of the bandwidth of the optical transmitter 100 during high-speed signal transmission.

The pre-emphasis unit 36 includes seventh and eighth transistors T7 and T8, ninth and tenth transistors T9 and T10, and 11th and 12th transistors T11 and T12. The seventh and eighth transistors T7 and T8 have sources coupled, in common, to the power supply terminal VDDL and gates coupled to each other. A drain of the seventh transistor T7 is coupled to the first output terminal $D_{OUTP}$, and a drain of the eighth transistor T8 is coupled to a gate of the eighth transistor T8. The ninth transistor T9 has a drain coupled to the first output terminal $D_{OUTP}$, and the tenth transistor T10 has a drain coupled to the drain of the eighth transistor T8. Gates of the ninth and tenth transistors T9 and T10 are coupled to third and fourth input terminals receiving the delayed differential input signals $D_{INP\_DEL}$ and $D_{INN\_DEL}$, respectively, and sources of the ninth and tenth transistors T9 and T10 are coupled to each other. The 11th and 12th transistors T11 and T12 have drains coupled to a common node of the sources of the ninth and tenth transistors T9 and T10; gates coupled, in common, to the bias terminal receiving the bias current $I_{BIAS}$; and sources coupled, in common, to the ground terminal VSS.

As such, the pre-emphasis unit 36 includes the seventh and eighth transistors T7 and T8, which have a current mirror structure. The pre-emphasis unit 36 additionally drives the first output terminal $D_{OUTP}$ in response to the delayed differential input signals $D_{INP\_DEL}$ and $D_{INN\_DEL}$, thereby preventing the reduction of the bandwidth of the optical transmitter 100 during a high-speed signal transmission operation.

The offset current control unit 38 controls an offset current $I_{OFFSET}$ of the first output terminal $D_{OUTP}$ in response to an offset control signal $I_{OS\_CTRL}$. The offset current control unit 38 includes first and second transistor arrays. The first transistor array includes a plurality of first transistors that have drains coupled to the first output terminal $D_{OUTP}$ in common and gates receiving the offset control signal $I_{OS\_CTRL}$. The second transistor array includes a plurality of second transistors that have sources coupled to the ground terminal VSS in common, gates coupled to the bias terminal receiving the bias current $I_{BIAS}$, and drains coupled to corresponding sources of the plurality of first transistors in the first transistor array, respectively.

The bias providing unit 39 includes a 13th transistor T13. The transistor T13 has a source coupled to the ground terminal VSS, and a drain and a gate that are coupled to the gates of the third and fourth transistors T3 and T4 of the main driver 32, to the gates of the 11th and 12th transistors T11 and T12 of the pre-emphasis unit 36, and to the gates of the plurality of second transistors in the second transistor array of the offset current control unit 38. Therefore, the 13th transistor T13 forms a current mirror structure with the third and fourth transistors T3 and T4 of the main driver 32, the 11th and 12th transistors T11 and T12 of the pre-emphasis unit 36, and the second transistor array of the offset current control unit 38, and provides the bias current $I_{BIAS}$ to the main driver 32, the pre-emphasis unit 36, and the offset current control unit 38.

The optical transmitter 100 according to the present embodiment can remove a common noise or power noise from the output terminals $D_{OUTP}$ and $D_{OUTN}$ having a differential structure. Even when the impedance of the laser diode 40 is non-linearly changed by a temperature variation, the optical transmitter 100 can accurately match the impedances of the output terminals $D_{OUTP}$ and $D_{OUTN}$, which have the differential structure. Therefore, the optical transmitter 100 can effectively remove a common noise or power noise by performing the accurate impedance matching, and provide a stable bandwidth and a high gain. Furthermore, the optical transmitter 100 can improve the bandwidth by additionally driving the first output terminal $D_{OUTP}$ to the current mode.

FIG. 4 illustrates the optical receiver 300 of FIG. 1 according to an embodiment.

Referring to FIG. 4, the optical receiver 300 is coupled to the photoelectric diode 50, and includes a first trans-impedance amplifier 62, a replica unit 70, a second trans-impedance amplifier 64, a multi-stage limiting amplifier 80, and a driver 90.

The photoelectric diode 50 converts an optical signal into an electrical signal, e.g., a current signal $I_{PD}$. The optical signal has been transmitted through the optical fiber 200 of FIG. 1.

The first trans-impedance amplifier 62 converts the current signal $I_{PD}$ into a first voltage signal TIA_P by amplifying a high-frequency component of the current signal $I_{PD}$. In the present embodiment, the description of an internal configuration of the trans-impedance amplifier 62 is omitted because the internal configurations of various trans-impedance amplifiers are well known to a person skilled in the art.

The replica unit 70 provides a regulated current $I_{REG}$ to the second trans-impedance amplifier 64. The regulated current $I_{REG}$ tracks a DC voltage from the current signal $I_{PD}$ converted by the photoelectric diode 50. The replica unit 70 serves as another photoelectric diode, which has a differential structure, while tracking a DC voltage corresponding to a light receiving state of the photoelectric diode 50.

The replica unit 70 includes a resistor $R_{IN}$ and a current regulator. The resistor $R_{IN}$ has one end coupled to the photoelectric diode 50 and an input terminal of the first trans-impedance amplifier 62, and the current regulator provides the regulated current $I_{REG}$ to the second trans-impedance amplifier 64. The regulated current $I_{REG}$ is regulated according to a magnitude of a DC voltage determined by the resistor $R_{IN}$. The current regulator may include a comparator 72 and a PMOS transistor PM. The comparator 72 has a first input terminal (+) coupled to the other end of the resistor $R_{IN}$ and a second input terminal (−) coupled to a feedback terminal FB receiving the regulated current $I_{REG}$. The PMOS transistor PM has a source coupled to a supply voltage terminal VDD, a gate coupled to an output terminal of the comparator 72, and a drain coupled to the feedback terminal FB and an input terminal of the second trans-impedance amplifier 64.

As such, the replica unit 70 tracks the DC voltage corresponding to the light receiving state of the photoelectric diode 50, and provides the regulated current $I_{REG}$ to the second trans-impedance amplifier 64, the regulated current $I_{REG}$ being regulated according to the DC voltage.

The replica unit 70 may further include a terminal 74 coupled to the feedback terminal FB and the input terminal of the second trans-impedance amplifier 64 to thereby use the regulated current $I_{REG}$ as a received signal strength indication (RSSI). The terminal 74 may be coupled to an external device (not illustrated). The RSSI may be used for a coupling operation between the optical fiber 200 and the photoelectric diode 50 in order to improve the received signal strength.

The second trans-impedance amplifier 64 amplifies the regulated current $I_{REG}$ into a second voltage signal TIA_N. The first and second trans-impedance amplifiers 62 and 64 may control an offset current in response to an offset current control signal $I_{OFF\_CTRL}$.

The multi-stage limiting amplifier 80 differentially amplifies the first voltage signal TIA_P provided from the first trans-impedance amplifier 62 and the second voltage signal TIA_N provided from the second trans-impedance amplifier 64, and outputs a pair of output signals LA_P and LA_N having a predetermined amplitude.

Since the multi-stage limiting amplifier 80 differentially amplifies the first voltage signal TIA_P, which is obtained by amplifying a high-frequency component of the current signal $I_{PD}$, and the second voltage signal TIA_N, which is obtained by amplifying the regulated current $I_{REG}$ corresponding to a DC component of the current signal $I_{PD}$, and provides the pair of output signals LA_P and LA_N, the RC passive filter for holding an opposite bias, which is included in the conventional optical receiver, can be omitted.

The driver 90 buffers the pair of output signals LA_P and LA_N, and provides a pair of data signals RX_OUTP and RX_OUTN to a pair of data output terminals. The pair of data output terminals may be coupled to other devices (not illustrated).

As described above, the optical receiver 300 according to the present embodiment can exclude the RC passive filter for filtering a noise and holding an opposite bias between the trans-impedance amplifier 62 and the multi-stage limiting amplifier 80. Therefore, a chip area occupied by the optical receiver 300 can be reduced compared to the conventional optical receiver including the RC passive filter, and a fast response characteristic can be expected.

Furthermore, the optical receiver 300 can monitor the DC voltage tracking the light receiving state of the photoelectric diode 50 and use the DC voltage as an RSSI. In addition, the optical receiver 300 can supply the coupling between the optical fiber 200 and the photoelectric diode 50.

According to the embodiments of the present disclosure, although the impedance of the laser diode 40 is changed by a temperature variation, the impedances of the output terminals $D_{OUTP}$ and $D_{OUTN}$ having a differential structure can be accurately matched.

Furthermore, it is possible to provide an optical transceiver which has a high gain and an excellent noise characteristic through the accurate impedance matching.

The optical transceiver according to the embodiments can prevent the reduction of a bandwidth of the optical transmitter by employing a pre-emphasis unit which additionally drives the output terminal $D_{OUTP}$.

Since the RC passive filter is excluded from the optical receiver, a chip area occupied by the optical receiver can be reduced while a fast response characteristic is expected.

The optical transceiver can easily check the RSSI by monitoring the DC voltage tracking the light receiving state of the photoelectric diode.

Although various embodiments have been described for illustrative purposes, it will be apparent to those skilled in the art that various changes and modifications may be made without departing from the spirit and scope of the invention as defined in the following claims.

What is claimed is:

1. An optical transceiver comprising:
   an optical transmitter configured to generate a first current signal for driving a laser diode in response to a data signal, and to provide the first current signal to the laser diode, such that the laser diode converts the first current signal into an optical signal and transmits the optical signal; and an optical receiver configured to receive a second current signal from a photoelectric diode that converts the optical signal into the second current signal, and to generate a pair of data signals from the second current signal, wherein the optical transmitter performs an impedance matching operation according to an impedance of a first output terminal coupled to the laser diode, and wherein the optical transmitter comprises a laser diode driver configured to drive the laser diode in response to differential input signals converted from the data signal, wherein the laser diode driver comprises:
- a main driver comprising first and second output terminals that have a differential structure, the main driver configured to drive the first and second output terminals in response to the differential input signals and to provide the first current signal to the laser diode through the first output terminal; and
- an impedance balancer configured to match impedances of the first and second output terminals by adjusting the impedance of the second output terminal according to signal states of the first and second output terminals, wherein the impedance balancer is further configured to generate a comparison result by comparing signals of the first and second output terminals, and to adjust the impedance of the second output terminal by pull-up or pull-down driving the second output terminal according to the comparison result.

2. The optical transceiver of claim 1, wherein the optical receiver comprises:
- a first trans-impedance amplifier configured to convert the second current signal into a first voltage signal by amplifying a high-frequency component of the second current signal;
- a replica circuit configured to output a current tracking a DC voltage of the second current signal;
- a second trans-impedance amplifier configured to convert the current of the replica circuit into a second voltage signal by amplifying the current; and
- a multi-stage limiting amplifier configured to differentially amplify the first and second voltage signals, and to output a pair of output signals having a predetermined amplitude.

3. The optical transceiver of claim 2, wherein the replica circuit comprises:
- a resistor having one end coupled to the photoelectric diode and to an input terminal of the first trans-impedance amplifier; and
- a current regulator configured to provide the current to the second transimpedance amplifier, the current being regulated according to a magnitude of a DC voltage determined by the resistor.

\* \* \* \* \*